(12) United States Patent
Stein

(10) Patent No.: US 7,720,705 B2
(45) Date of Patent: May 18, 2010

(54) SYSTEM AND METHOD FOR REAL-TIME UPDATING SERVICE PROVIDER RATINGS

(75) Inventor: James Stein, Sebastapol, CA (US)

(73) Assignee: Service Ratings, LLC, Chevy Chase, MD (US)

( * ) Notice: Subject to any disclaimer, the term of this patent is extended or adjusted under 35 U.S.C. 154(b) by 0 days.

(21) Appl. No.: 10/458,381

(22) Filed: Jun. 11, 2003

(65) Prior Publication Data

US 2004/0044563 A1 Mar. 4, 2004

Related U.S. Application Data

(63) Continuation of application No. 09/487,963, filed on Jan. 18, 2000, now abandoned.

(51) Int. Cl.
*G06Q 99/00* (2006.01)

(52) U.S. Cl. ............................................. 705/10; 705/1

(58) Field of Classification Search ................ 705/10, 705/7, 1
See application file for complete search history.

(56) References Cited

U.S. PATENT DOCUMENTS

| | | | |
|---|---|---|---|
| 4,345,315 A | 8/1982 | Cadotte et al. | |
| 4,603,232 A | 7/1986 | Kurland et al. | |
| 4,872,113 A | 10/1989 | Dinerstein | |
| 5,056,019 A | 10/1991 | Schultz et al. | |
| 5,619,558 A | 4/1997 | Jheeta | |
| 5,668,953 A * | 9/1997 | Sloo ............................... | 705/1 |
| 5,724,262 A | 3/1998 | Ghahramani | |
| 5,808,908 A | 9/1998 | Ghahramani | |
| 5,862,223 A * | 1/1999 | Walker et al. ................. | 705/50 |
| 5,895,450 A * | 4/1999 | Sloo ............................... | 705/1 |
| 5,915,243 A | 6/1999 | Smolen | |
| 5,991,595 A * | 11/1999 | Romano et al. ............. | 434/353 |
| 6,029,195 A | 2/2000 | Herz | |
| 6,039,244 A | 3/2000 | Finsterwald | |
| 6,061,660 A | 5/2000 | Eggleston et al. | |
| 6,070,145 A | 5/2000 | Pinsley et al. | |

(Continued)

FOREIGN PATENT DOCUMENTS

CA 2 295 423 A1 7/2001

OTHER PUBLICATIONS

Dell, A.; "The Next Big Wave," *The Industry Standard*, Aug. 21, 2000, p. 83.

(Continued)

*Primary Examiner*—Akiba K Robinson Boyce

(57) ABSTRACT

Service providers are evaluated and rated according to criteria that includes customer satisfaction with the services provided by the service provider. If the service provider meets and/or exceeds certain predetermined criteria, the service provider is certified, and a list of certified companies together with a satisfaction rating, is posted on an Internet Web site maintained by the rating company for access by the consuming public. A member of the consuming public, wishing to use the service of a certified company, may register his/her credit card with the Rating Company. When the service is rendered, and paid for by the registered credit card, the payment is detected to trigger the sending of Internet e-mail to the consumer to solicit information as to the consumer's satisfaction with the service. A response to the Internet e-mail by the Rating Company is used to update on a real-time basis the customer satisfaction of the service provider that provided the service.

13 Claims, 5 Drawing Sheets

U.S. PATENT DOCUMENTS

| | | | |
|---|---|---|---|
| 6,070,147 | A | 5/2000 | Harms et al. |
| 6,088,717 | A * | 7/2000 | Reed et al. ................. 709/201 |
| 6,102,287 | A * | 8/2000 | Matyas, Jr. .................. 235/380 |
| 6,236,975 | B1 * | 5/2001 | Boe et al. ....................... 705/7 |
| 6,260,024 | B1 * | 7/2001 | Shkedy ........................ 705/37 |
| 6,317,718 | B1 | 11/2001 | Fano |
| 6,343,275 | B1 | 1/2002 | Wong |
| 6,477,504 | B1 | 11/2002 | Hamlin et al. ................ 703/10 |
| 6,502,745 | B1 | 1/2003 | Stimson et al. ............. 235/375 |
| 6,594,376 | B2 | 7/2003 | Hoffman et al. |
| 6,711,581 | B2 | 3/2004 | Rebane ....................... 707/102 |
| 6,856,963 | B1 * | 2/2005 | Hurwitz ....................... 705/10 |
| 2001/0032156 | A1 * | 10/2001 | Candura et al. .............. 705/36 |
| 2002/0002482 | A1 | 1/2002 | Thomas ....................... 705/10 |
| 2005/0004978 | A1 * | 1/2005 | Reed et al. ................. 709/203 |

OTHER PUBLICATIONS

Digital Marketing Services Website, Incentive Marketing, http://www.dmsdallas.com/marketing.html, 3 pages.

Digital Marketing Services Website, Online Research, http://www.dmsdallas.com/custom_research.html, 3 pages.

Digital Marketing Services Website, Company Overview, http://www.dmsdallas.com/company_overview.html, 2 pages.

Digital Marketing Services Website, "The Emperor Gets New Clothes" by Dennis E. Gonier, http://www.dmsdallas.com/emperor_article.html, 13 pages.

Planet Feedback Website, Planet Feedback Welcomes You!, http://www.planetfeedback.com/homepage/0,1264,,00.html, 2 pages.

Planet Feedback Website, Register, http://www.planetfeedback.com/my_feedback/register/1,1325,,00.html, 2 pages.

CustomerSat.com Website, Real Time Results, http://www.customersat.com/svc/004main.html, 2, pages.

CustomerSat.com Website, See the Power of Customersat.com's Web Survey System, http://wwwcustomersat.com/frt/000mail.html, 1 page.

CustomerSat.com Website, Registration, http://www.customersat.com/s/Wjeer.asp?its=True, 2 pages.

CustomerSat.com Website, Personalizing Surveys and Invitations, http://wwwcustomersat.com//svc/007mainm.html, 2 pages.

CustomerSat.com Website, Web Based Tracking Studies, http://www.customersat.com/svc/006main.html, 2 pages.

CustomerSat.com Website, Main Page, http://www.customersat.com/000main.html, 1 page.

CustomerSat.com Website, Company Overview, http://www.customersat.com/com/000main.html, 2 pages.

CustomerSat.com Website, 2000 Sample Questions, http://www.customersat.com/bsp/006main.html, 2 pages.

CustomerSat.com Website, Best Practices, http://wwwcustomersat.com/bsp/000main.html, 1 page.

CustomerSat.com Website, Profile Customers as They Exit Your Website, http://www.customersat.com//svc/003main.himl, 3 pages.

Epinions.com Website. Homepage, http://www.epinions.com.

Epinions.com Website, Epinions.com Helps you make more informed decisions about nearly everything, http://www.epinions.com/registration.html, 1 page.

Epinions.com Website, The Web of Trust, http://www.epinions.com/help/index.html?show=web_of_trust, 2 pages.

Epinions.com Website, Rating Opinions, http://www.epinions.com/help/index.html?show=rating, 1 page.

Epinions.com Website, Writing Opinions, http://www.epinions.com/help/index.html?show=writing, 1 page.

Epinions.com Website, Getting Started, http://www.epinions.com/help/index.html?show=get_started, 2 pages.

Epinions.com Website, Tour, http://www.epinions.com/help/index.html?show=tour, 2 pages.

Epinions.com Website, Earning on Epinions.com, http://www.epinions.com/help/index.html?show=earning, 2 pages.

Gomez.com Website, Company Overview, http://www.gomezadvisors.com/About/about.cfm?art_id=5068, 7 pages.

Gomez.com Website, Gomez Alliance, http://alliance.gomez.com/alliance/welcome.asp, 2 pages.

Gomez.com Website, Gomez is the Internet Quality Measurement Firm for Both Consumers and e-Businesses, http://www.gomezadvisors.com/About/about.cfm?topcal_id=0, 2 pages.

Gomez.com Website, Sign Up Now to Join the Gomez.com Community—It's Free!, http://www.gomez.com/Registration/register.cfm?topcal_id=0, 2 pages.

Active Research Website, ARI Overview, http://www.activeresearch.com/profile/arioverview.html, 1 page.

Active Research Website, Vision, http://www.activeresearch.com/profile/vision.html, 1 page.

Active Research Website, History, http://www.activeresearch.com/profile/facts.html, 5 pages.

Active Research Website, Products & Services, http://www.activeresearch.com/products/products.html, 1 page.

Active Research Website, A Revolution in Market Intelligence, http://www.activeresearch.com/products/mra.html, 3 pages.

e-Satisfy.com Website, Site Map, http:/www.customerinsights.com/sitemap.com, 1 page.

e-Satisfy.com Website, Services, http://www.customerinsights.com/services.html, 1 page.

e-Satisfy.com Website, Site Monitor Turns Surfers into Customers, http://www.customerinsights.com/sm.html, 2 pages.

BizRate.com Website, Welcome to BizRate.com's C3 Marketplace$^{SM}$, http://www.bizrate.com, 1 page.

BizRate.com Website, Signup, http://www.bizrate.com/mybizrate/signup.xpml, 1 page.

BizRate.com Website, Store Profile and Customer Evaluation, http://www.bizrate.com/ratings_guide/report.xpml?mid=19004, 2 pages.

BizRate.com Website, About BizRate.com, http://www.bizrate.com/content/about.xpml, 2 pages.

www.prio.com "How it Works for Consumers", 3 pages.

ValueStar, "Register Online" www.marmalade.com/va_bs/web1/consumer/register/register.html (non-public development server) 1 page, Oct. 8, 1999.

ValueStar, "Consumer Benefits" www.marmalade.com/vs_bs/web1/consumer/benefit/benefits.html (non-public development server) 3 pages, Oct. 14, 1999.

ValueStar, "Rate This Company," www.marmalade.com/vs_bs/consumer/rate/rate_comp.html (non-public development server) 3 pages, Oct. 21, 1999.

ValueStar "Register Online" www.marmalade.com/vs_bs/web1/consumer/register/reg_frm.html (non-public development server) 1 page, Oct. 8, 1999.

ValueStar, "Rating Process" www.marmalade.com/vs_bs/web1/consumer/rate/rate.html, (non-public development server), 1 page, Oct. 25, 1999.

Office Action mailed Dec. 18, 2003 for U.S. Appl. No. 09/702,045, 14 pages.

Office Action mailed Jul. 20, 2004 for U.S. Appl. No. 09/702,045, 16 pages.

Office Action mailed Feb. 22, 2005 for U.S. Appl. No. 09/702,045, 16 pages.

Office Action mailed Jul. 26, 2005 for U.S. Appl. No. 09/702,045, 19 pages.

Office Action mailed Feb. 6, 2006 for U.S. Appl. No. 09/702,045, 16 pages.

Office Action mailed Sep. 6, 2006 for U.S. Appl. No. 09/702,045, 15 pages.

Office Action mailed Feb. 19, 2008 for U.S. Appl. No. 09/702,045, 21 pages.

Office Action mailed Sep. 24, 2008 for U.S. Appl. No. 09/702,045, 21 pages.

Office Action mailed Jun. 8, 2009 for U.S. Appl. No. 09/702,045, 22 pages.

Office Action mailed Aug. 14, 2002 for U.S. Appl. No. 09/487,963, 8 pages.

GB Search Report mailed Dec. 4, 2001 for Application No. GB 010333.3, filed Jan. 18, 2001 (Publication No. GB2365571, published Feb. 20, 2002), 3 pages.

Dyan Machan, "An Edison for a New Age?" Forbes, May 17, 1999, 178-85.

e-Satisfy.com, Home, available at www.customerinsights.com (2000).

Active Research, Market Research Automation Services (3 pages), available at www.activeresearch.com/products/ara_1.html (no date).

Active Research, "About Active Research Advisor," (2 pages), available at www.activeresearch.com/products/ara_4a.htm. (no date).

Active Research, "About Active Research Update," (2 pages), available at www.activeresearch.com/products/ara_4b.htm (no date).

Active Research, "About ActiveFlash Surveys" (2 pages), available at www.activeresearch.com/products/ara_4c.htm (no date).

Active Research, "About Active Research Quarterly," (2 pages), available at www.activeresearch.com/products/ara_4d.htm (no date).

eBay.co.uk "What is Feedback?" (2 pages), available at http://pages.ebay.co.uk/services/forum/feedback.html (Prior to Nov. 11, 2001).

eBay.co.uk, "Why is the Feedback Forum one of Your most Valuable Tools?" (2 pages), available at http://web.archive.org/web/19991127225226/http://pages.ebay.co.uk/services/forum/feedback.html (1999).

CheckFree, "About Check Free," (2 pages) available at wysiwyg://6/http://www.checkfree.com/about/1,1001,3,00.html. (1999).

CheckFree, "About CheckFree: News," (5 pages), available at wysiwyg://9/http://checkfree.com/newsresults/1,1074,233,00.html (1999).

TeleCheck, "Making Checks Our Responsibility," (2 pages), available at wysuwyg://17/http://www.telecheck.com/home/home.html (1999).

Louis Trager, "ValueStar finds golden goose in consumer guide," San Francisco Examiner, Business, D-1, D-7 (Feb. 25, 1996).

* cited by examiner

---
SATHER GATE CATERING

12567 Telegraph Ave.
Berkeley, CA 94512 tel: 510-775-5301
fax: 510-775-6301 e-mail: catering@sgate.com web: http://www.sgate.com

---

| RATE THIS COMPANY |
| PLACE ORDER |
| ADVANCED SEARCH |
| NEW SEARCH |

| Legend ◇ Purchase Online | □ Credit Cards Accepted | | |
|---|---|---|---|
| △ Weekend & Night Appointments | ○ Schedule Online | | |
| Category | Personal Services | Rating information for this company is provided below. Please scroll down to the end of this page. | Ratings  92%  Current Monthly Rating for this company. Score range from 1 to 100. Ratings based on customer satisfaction of products/services received.  259  Total # of rating this year  90% Average Yearly Rating  $876 Average Purchase Amount |
| Subcategory | Catering | | |
| Service Area | All Bay Area Counties ◇ □ | | |
| Hours | 10-6 pm M-F ○ | | |
| Availability | Weekends by appt. only △ | | |
| Years in Business | 14 | | |
| Employees | 45 | | |
| VS License | 5841 | | |
| Owner's Name | | | |

*FIG. 1.*

| | | |
|---|---|---|
| *Rate This Company...* <br> SATHER GATE CATERING <br> 12567 Telegraph Ave. <br> Berkeley, CA 94512 <br> tel: 510-775-5301 <br> fax: 510-775-6301 <br> e-mail: catering@sgate.com <br> web: http://www.sgate.com | | ← 82 |

YOUR INFORMATION

The information in this section has been auto filled from the database. If you find a error please update your account information before your place you next online order. To change any error in the information below simply select the type in the text box and retype the correct information. (Please note: changes made here do not update the ValueStar database)

| | |
|---|---|
| Your Full Name | |
| Address | |
| City | |
| State, Zip | |
| Phone | |
| Email | |

← 84

RATING QUESTIONS

| | |
|---|---|
| Estimated Date of Service/Product | ☐/☐/☐ |
| Estimated Cost of Service/Product | $ ☐ |
| Please rate the quality of customer service you received from this company | ○ Excellent <br> ○ Above Average <br> ○ Average <br> ○ Fair <br> ○ Poor |
| Please rate the product/ service you received from this company | ○ Excellent <br> ○ Above Average <br> ○ Average <br> ○ Fair <br> ○ Poor |
| If faced with a similar project in the future will you consider using this company again? | ○ Yes   ○ Maybe   ○ No |
| Will you recommend this company to friends? | ○ Yes   ○ Maybe   ○ No |

SYSTEM AND METHOD FOR REAL-TIME UPDATING SERVICE PROVIDER RATINGS

CROSS-REFERENCE TO RELATED PATENT APPLICATION

This application is a continuation application of U.S. patent application Ser. No. 09/487,963 entitled "System and Method for Real-Time Updating Service Provider Ratings," filed Jan. 18, 2000 now abandoned, which is incorporated herein by reference in its entirety.

BACKGROUND OF THE INVENTION

The present invention relates generally to a rating system that for gathering consumer feedback in order to rate businesses according to predetermined criteria. The ratings information developed thereby is made available to members of the consuming public to allow them to make a selection of a local business based upon the customer satisfaction experiences of others. More particularly, the invention relates to a method, and a system for implementing that method, for updating the ratings on a real-time or near real-time basis, based on specific, verified transactions between consumers and businesses.

When searching for a local service (i.e., anything from dentistry to window replacement to legal advice), the consuming public is often faced with a daunting array of choices. It is believed that approximately $2 trillion is spent annually with six million or so service companies now doing business in America. Thus, searching through the available services to find that one that best satisfies one's needs and expectations is not an easy task. One solution is to use the familiar "Yellow Pages" for a list of unselective self-promotions of various businesses and service providers. A better approach would be the recommendation of a friend or acquaintance, but this provides only a small sampling of satisfied (or not so satisfied) customers of the business in question.

Another alternative has been to turn to those who make available evaluations and surveys through magazines, ranking various businesses and services according to predetermined criteria. One such evaluation system provides a rating scheme in which a satisfaction value is obtained through a sampling of a business' customers. Coupled with the satisfaction value so developed from the sampling is and investigation that checks to ensure that the business in question has proper and appropriate "documentation" (i.e., licenses, insurance, and the like). Those businesses meeting a predetermined criteria of customer satisfaction and proper documentation are "certified," and lists of the certified companies are then made available to the consuming public, either in hard copy (e.g., a magazine) or via a Web page (see, e.g., http://valuestar.com). In addition, the certified businesses are subjected to annual follow-up checks to ensure that they still meet the criteria necessary for retention of the certification. Those who have let their customer satisfaction slip below a certain level are removed.

However, the time-lapse between the annual follow-up checks of a certified business can present a problem. Businesses previously certified may become inattentive or otherwise not perform up to an expected level, thereby letting its customer satisfaction drop. Until the business is reevaluated it is still identified as being certified, keeping the customer satisfaction value it obtained prior to its slide, thereby misleading consumers.

Other ratings systems exist whereby consumers can register their opinions about particular service businesses over the Internet. Unfortunately, these systems allow consumers to volunteer ratings for businesses not recently, or indeed never, used by the particular consumer. Still other electronic ratings systems are tied to specific "e-commerce" transactions over the Internet. However, most local businesses reside in the "bricks and mortar" world. Accordingly, a system for tracking e-commerce transactions cannot possibly offer a statistically significant rating that is tied to verifiable transactions between consumers and businesses. Thus, there is need for updating a real time ratings system, particularly one that is based on specific, verified transactions local to the consumers.

SUMMARY OF THE INVENTION

The present invention is a method for updating business ratings provided by an on-line rating service on a real-time, or near real-time, basis. Thereby, a consumer using the on-line consumer guide to look for a service can be relatively sure that the customer rating value of the service rendered by a service provider business in question is as current as possible.

Broadly, the invention involves identifying a transaction between a customer and service provider soon after the transaction is consummated and paid for, and sending the customer a communication that solicits the customer's satisfaction of the service provided through the transaction. One embodiment of the invention uses a communication medium, including a conventional Internet connection, to communicatively interconnect the customer, the service provider business, the Rating Company and a Financial Service Processor (e.g., bank or credit card processing company). Using the Internet connection, the customer registers a financial services account number (e.g., a credit card number or a checking account number) with the Rating Company. A database containing this customer's financial services account number together with those of other similarly registered customers or buyers is forwarded to and stored by the Financial Service Processor. The Rating Company also supplies the Financial Service Processor with the merchant numbers of all the service providers certified by it—either by inclusion in the database containing customer financial services account numbers, or in a separate database. Then when a register customer makes a purchase of a service from a certified service provider, and pays for that service with a credit card or check or other electronic payment means tied to a financial services account number previously registered with the Rating Company, that purchase will be detected at the Financial Service Processor. The Financial Service Processor notifies the Rating Company of the purchase. This notification will trigger the transmission of an email to the customer with a simple electronic form that asks for information concerning the customer's satisfaction of the service received. Upon receipt of the filled-out form, the Rating Company updates the database containing the information about the business.

In another embodiment of the invention, the Rating Company may contract with particular Financial Service Processors such as a bank or credit card company to register all its customer checking or credit card accounts, and supply the account numbers of the customers to the Rating Company. The Rating Company may then supply the Financial Service Processor with flyers to send to its customers, notifying them of registration and of the rewards (e.g., frequent flyer miles) of using companies certified by the Rating Company. The customer, should he/she choose to reply to the flyer, will supply the same information as described above, i.e., a financial services account number of one type or another (e/g/, credit card number), and email address.

A number of advantages are achieved by the present invention. The invention retrieves the satisfaction of a customer while the recollection of the service provided is still fresh in the customer's mind. Also, using the recollection to update the satisfaction "quotient" of a business provides a realistic, real-time rating of the business.

These and other advantages and aspects of the invention will become apparent to those skilled in this art upon a reading of the following description of the invention, which should be taken in conjunction with the accompanying drawings.

BRIEF DESCRIPTION OF THE DRAWINGS

FIG. 1 is an illustration of a Web page of an Internet Web site;

FIG. 5 is an illustration of a form as may be used for eliciting information as to how satisfied a customer was with services provided by a business.

DESCRIPTIONS OF SPECIFIC EMBODIMENTS

The particular consumer guide to which the present invention is directed is in both a magazine and on-line form. It is the on-line form that the invention finds particular use. The assignee of the present invention is a rating company that rates service provider businesses based upon: (1) a check of the legal and financial status of the service provider; (2) checks to verify that the service provider carries the necessary state licenses for the services it offers; (3) a check to verify the service provider's certificates of insurance; and (4) a survey of a sampling of the service provider's customers to determine how satisfying the customers found the services were, to obtain therefrom a customer satisfaction rating. If these checks and verifications reach and/or exceed a predetermined standard, the service provider is "certified," and put into a list of similarly certified service providers. The list of certified service providers is then made available to the consuming public.

Figure 4:
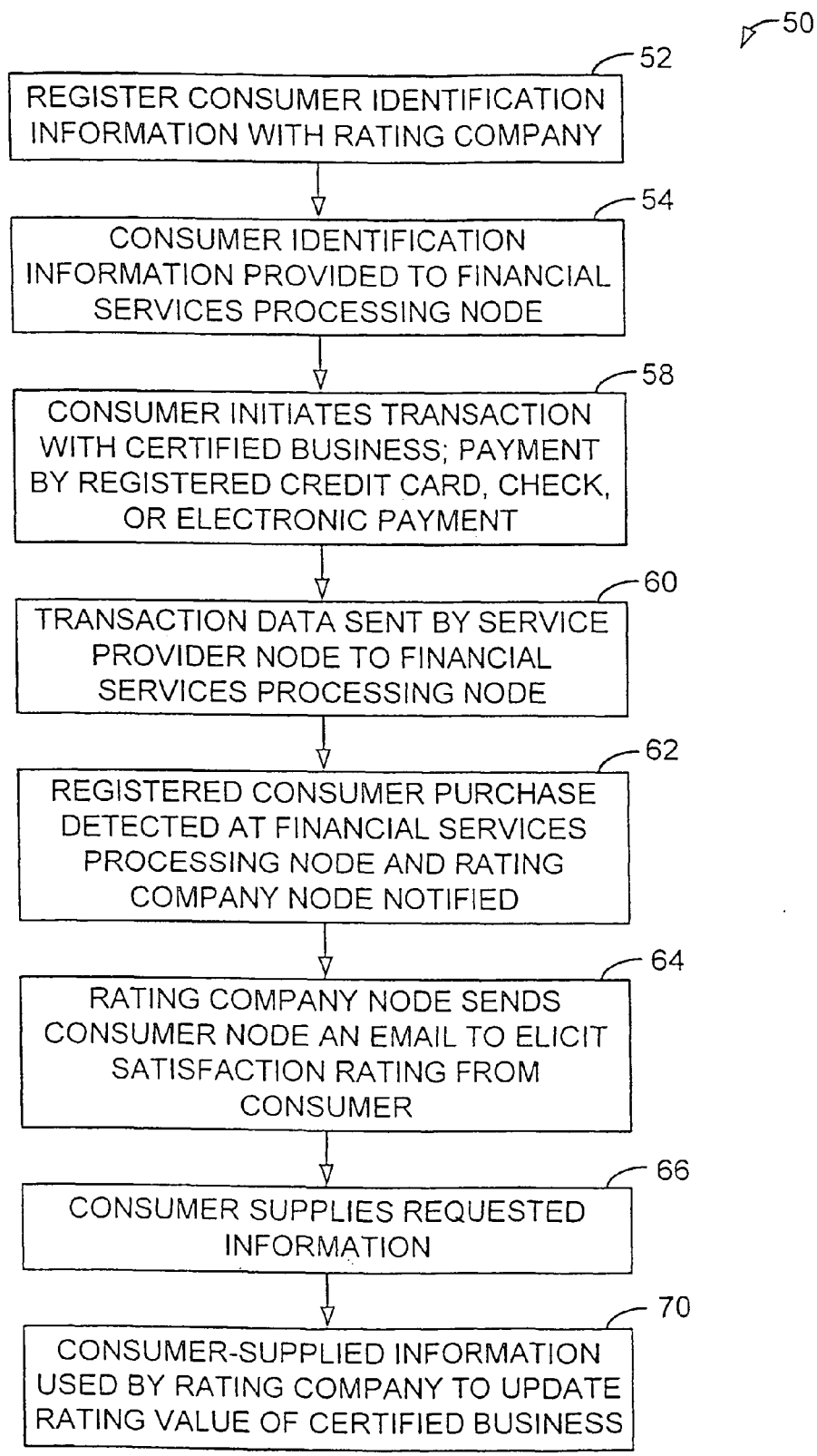
FIG. 4 is a flow diagram broadly outlining the steps used for implementing the method of the present invention.

The on-line version of the list, accessible via a searchable Internet Web site (with the consumer using proper Internet connection equipment, such as is illustrated in FIG. 4, and an appropriate browser), is the preferred form. As with many Web sites, the on-line version of the consumer guide allows a consumer/prospective customer to search the site according to criteria selected by the consumer, and according to what type of service the consumer is looking for. The site may provide information about a certified company that may fit the need of the consumer in a form similar to that shown in FIG. 1.

Assume that a consumer is looking to hire a catering service for a planned party or other function. The consumer logs onto the Rating Company's on-line consumer guide Internet Web site, and performs a search. The search delivers a list of several catering services in the consumer's geographical area that meet the consumer's needs, ranked by the ratings that those caterers had received from previous consumers. The consumer can select one or more of them for more information, being ultimately directed to a Web page that provides pertinent information about the business. FIG. 1 is an example of such a Web page, designated generally as 2, illustrating in simplified form the information that may be provided by such a search. As FIG. 1 illustrates, the Web page 2 includes an identification field 3 that contains the name, address, telephone number and other contact information (e.g., email address) of the business—here a catering service. Also provided, in a field 5, is information concerning the area of operation, hours of operation, etc. A field 6 provides hyperlink connections to other pages that allow the consumer to rate the company, providing a Web page such as that shown in FIG. 5, or a link that brings the consumer to an order Web page, allowing the consumer to order services on-line if desired. In particular, the Web page 2 of FIG. 1 provides a customer satisfaction rating 8 in field 4.

Figure 2:
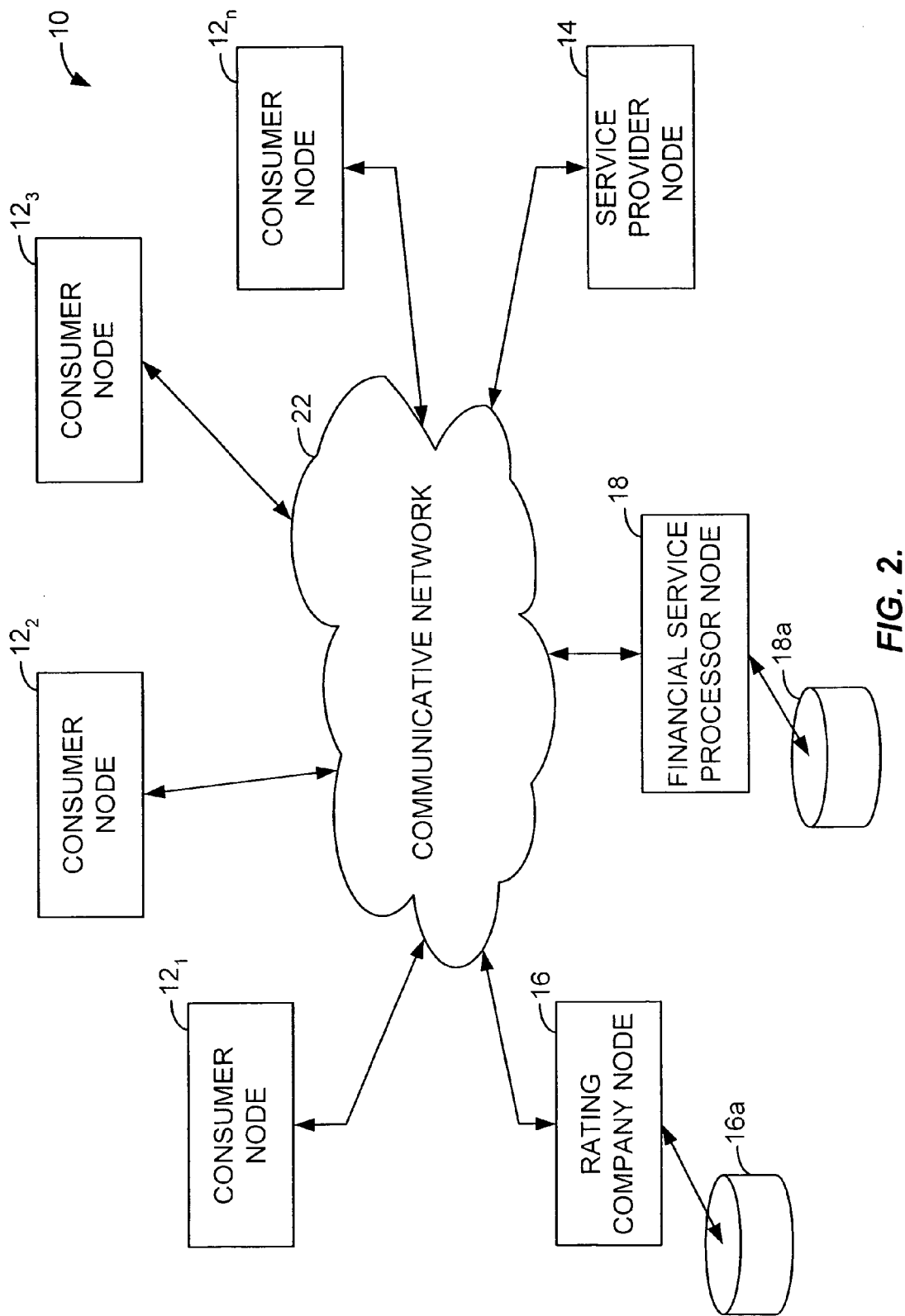
FIG. 2 broadly illustrates a system for implementing the present invention.

Referring now to FIG. 2, there is shown a system designated generally with the reference numeral 10 that includes a number of nodes 12, 14, 16, and 18. Much of consuming public owns personal computers with connection for electronic communication via the Internet. This is represented by the "Consumer nodes" 12 ($12_1$, $12_2$, ..., $12_n$). The "Service Provider" node 14 generally represents a service provider (e.g., dentists, contractor, cabinetmaker, dry cleaning, etc.). A "Rating Company" 16, i.e., a company that evaluates and rates service providers as described above, is shown at 16. Preferably, the Rating Company 16 will have the capability of electronic communication with the Consumer nodes 12 for reasons that will become clear below. A Financial Service Processor node 18, preferably also communicative coupled to the Rating Company and to the Service Provider node 16, completes the system 10.

As used herein, a Financial Service Processor (FSP) is a financial payment service of one type or another. For example, an FSP may be a bank with which the service provider does business, or with which a customer has a checking account, or it may be a credit card processing company. Alternatively, it may be an on-line payment service, or it may be a check verification service. As will be seen, any of these services will operate with the present invention.

Continuing with FIG. 2, various nodes 12-18 are shown communicatively interconnected by a "communicative network" 22. Preferably, the Consumer nodes 12 and Rating Company node 16 are Internet capable, i.e., they use the Internet to communicate with one another by both email and a Web site run by the Rating Company 16). This means that Rating Company node 16 will preferably have the necessary instrumentality to provide Internet Web site access to company rating and evaluation information for consumers. The Internet Web site will preferably also allow the consumers to supply a modicum of information about themselves for registration purposes.

There need not be a communicative interconnection between the Service Provider node 14 and the Rating Company node 16 or Consumer nodes 12 for application of the present invention. It is preferable, however to have a communicative connection between the Service Provider node 14 and the FSP node 18. This latter connection is preferably by a dedicated line or other secure connection for data transfer involving transactions consummated by the Service Provider Node and consumers (i.e., the business at the node). Similarly, the communicative connection between the Rating Company node 16 and the FSP node 18 is preferably a secure line of one sort or another.

Thus, the communicative network 22 symbolizes an aggregate of communicative interconnections commonly used in today's commerce and as may exist or be available between the nodes 12-18.

As FIG. 2 illustrates, the FSP node 18 maintains a database $18_a$ whereat is kept consumer financial information (i.e., credit card numbers or checking account numbers) that is searchable for processing payment of a commercial transaction by credit card or check or other on-line payment by the consumer. The database $18_a$ will also have a Service Provider Number. Similarly, the Rating Company node 16 typically includes a data processing system (not shown) that includes the capability of providing a server function for Internet operations (i.e., email and provision of a Web site). Alternatively, of course, the Rating Company node 16 could use the services on an Internet service provider (ISP; not shown) to host the web site. The Rating Company node also includes a database $16_a$ that contains the business rating and evaluation information available for Internet access by consumers (or others). The database will also maintain consumer information, including email addresses, according to the present invention as described more fully below. In addition, the database will include, for each certified service provider, the "merchant number" of the service provider (or merchant numbers if the service provider has more than one). A merchant number is that identification assigned a service provider by the bank with which the service provider does business. If the service provider does business with more than one financial institution (e.g., with one bank for credit card transactions, and another for banking), then the service provider will have more than one merchant number.

Figure 3:
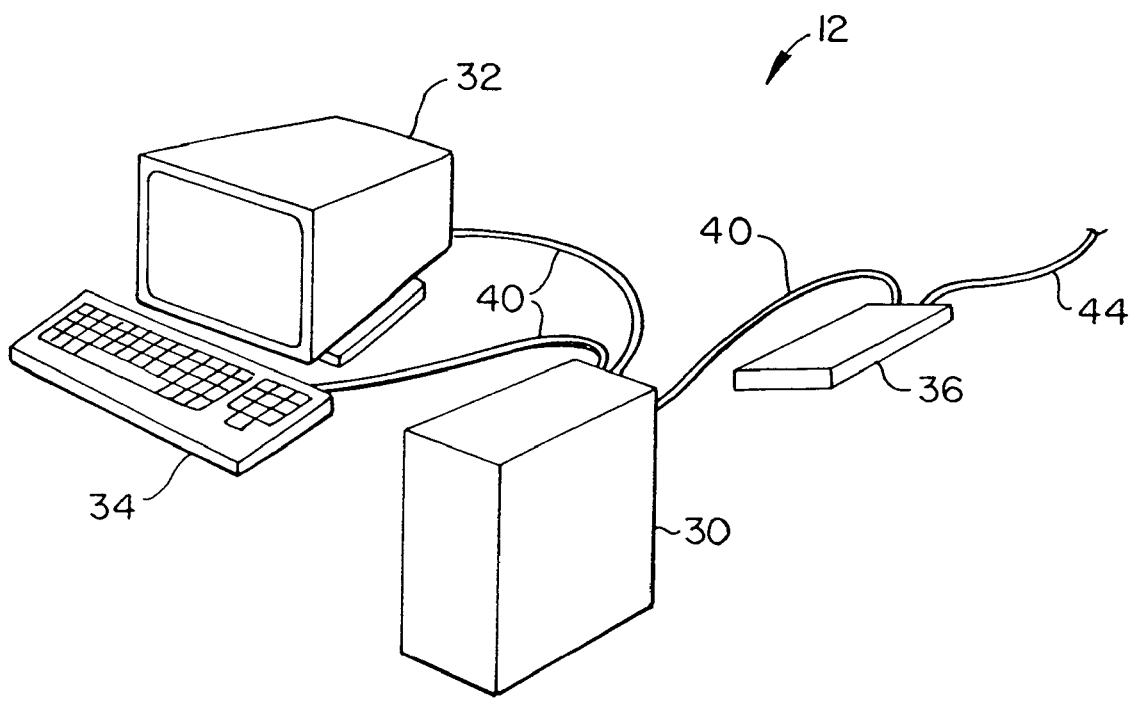
FIG. 3 illustrates a computing system as may be used by a consumer to register with a service provider for receiving email solicitations to rate the satisfaction of a business.

Referring now to FIG. 3, there is at least one version of a configuration of computing apparatus as may be found at a consumer node 12, shown here as consumer node $12_j$. As shown, the node $12_j$ includes a main cabinet 30 that houses the principle processing system, including a central processing unit and various peripheral equipment such as floppy and hard drives, CD ROM readers, and the like. The processing system connects to a CRT monitor 32, keyboard 34, and a communication device 36 by appropriate cables 40. The consumer node $12_j$ may also include a conventional pointing device (e.g., mouse or track ball; not shown) of one sort or another for point-and-click selection operations. The communication device 36 preferably provides Internet access (via an appropriate ISP) and may take the form of a standard modem connection to the telephone lines 44. Alternatively, the communication device may be of a type that provides ISDN, DSL, ASDL, cable, or even a satellite dish connection.

The consumer node $12_j$ could be a conventional television set with a WebTV connection rather that the PC system shown in FIG. 3. (WebTV is a registered trademark of Microsoft Corporation of Redmond Wash.) Whatever the configuration used, the consumer node $12_j$ preferably has both email and Internet capability, but at a minimum email capability.

The Rating Company node 16 will make available to the consuming public, via its Internet Web site, the identification and a relative rating of the various service providers it has evaluated—based upon on information gathered by the Rating Company. Such information may include a listing of those service providers found to have met and/or exceeded predetermined criteria set by the Rating Company, including a customer satisfaction value indicative of the satisfaction of those consumers who have purchased or have been provided with the services rendered by the service provider. A real-time updating of the customer satisfaction value of the service provider is an object of the present invention according to the steps outlined in the flow diagram illustrated in FIG. 4. It is also possible that the ratings could be made available to the consuming public via other portals or ecommerce Web sites that would recompense the Rating Company for the rights to display the Ratings information.

FIG. 4 illustrates the major steps that may be taken to update customer satisfaction ratings according to the present invention. That update process may begin with step 52 when a consumer, from one of the consumer nodes 12, e.g., consumer node $12_j$ (FIGS. 1 and 2), logs onto the Internet to access the Web site maintained by the Rating Company node 16. The Web site may include a "registration" page at which a consumer, from the consumer node $12_j$, supplies personal information, including an email address and a credit card number of the credit card that may be used in a commercial transaction. This information will be used later, as described below, to identify a service purchased from a company that has been certified by the Rating Company to identify the transaction and prompt an email request for information as to the satisfaction of the consumer.

The information provided by the consumer to the Rating Company is placed in the database $16_a$ maintained by the Rating Company node 16. The list of service providers certified by the Rating Company will also be in the database $16_a$, together with the merchant number(s) of each certified service provider, or the list may have previously been sent to the FSP node separately for storage in the database $18_a$. And, step 54 sees the Rating Company node 16 forwarding certain portions of the information provided by the consumer, such as the consumer's credit card number or bank account number to the FSP node and placed in the database $18_a$. This will allow the FSP to correlate certified service providers (by the associated merchant number(s)) from whom services have been purchased with credit cards or checks or on-line payments drawn on checking accounts that have been registered with the Rating Company node 16.

At step 58, a transaction is consummated between a consumer and one of the service providers certified by the Rating Company involving payment with the credit card whose number was previously registered with the Rating Company node 16. The credit card transaction data is transmitted, in step 60, and via the communicative network 22 (e.g., via a dedicated line), to the FSP node 18 for payment. The FSP node will search its database $18_a$ for a credit card number that matches that used for the transaction with the particular (certified) service provider. This search will detect the credit card number previously registered by the consumer in step 52. It will also detect that the transaction occurred with a certified service provider by the merchant number associated with the information that was conveyed to the FSP.

Having detected use of a registered credit card or check or on-line payment tied to a registered bank account for a transaction with a certified company, the FSP node 18 will electronically notify the Rating Company node 16, providing the Rating Company with an identification of the registered consumer's credit card number or bank account number (step 62), the merchant number associated with the service provider involved in the transaction, the date of the transaction, and the amount of payment. This notification will in turn, prompt the Rating Company node 16 to conduct a search of its database $16_a$ for information related to the credit card number or bank account number, and find the information previously provided by the consumer, including the consumer's e-mail address. This, at step 64, will prompt the sending of a form email by the Rating Company node 16 to the consumer node $12_j$. The email from the Rating Company node could include a form similar to that shown in FIG. 5, or the email may include a URL that provides a link to a Web page having the same form. The form, as can be seen in FIG. 5 solicits information from the consumer as to how satisfied the consumer was with the service purchased. Alternatively, it is also possible, for certain consumers that do not have access to the Internet, for the Rating Company to automatically call the consumer by telephone to obtain a satisfaction opinion from the consumer.

Preferably, however, the form would be much simpler than that illustrated in FIG. 5. To ensure as much as possible that there will be a reply, the answers to only two questions may be requested, followed by a request for a more detailed response if the consumer so desires. The two questions may be:

1. On a scale of 1 to 10, 1 being very dissatisfied and 10 being very satisfied, how do you feel about the value you've received most recently from the [identified service provider]?
2. Would you recommend this merchant to others (Y/N)?

Both questions need not be answered in the same manner to be counted. The answers to these questions are then used to develop the satisfaction rating for the service provider, using the following relation:

Rating=(0.5×Satisfaction Rating (from 0 to 10)×10)+ (0.5×Recommend to a Friend [O for no, 100 for yes]).

For example, if the response were that the service provider would be recommended to a friend with a rating of 8 out of 10, the score would be Rating=(0.5×8×10)+(0.5*100)=40+50=90

The consumer may be asked for more detailed information, such as illustrated in FIG. 5 which shows an exemplary screen portion of what would be sent or otherwise made accessible (e.g., as by a link embedded in an email to the consumer node 12) to the consumer, to illicit such additional or more detailed information. The screen, designated generally by the reference numeral 80, contains an informational field 82 and five major entry fields 84-92. As can be seen, the informational field 84 identifies the service provider for which a satisfaction rating is being requested of the consumer.

Entry field 84 provides the certain of the consumer identification information for review and correction by the consumer. Entry fields 86, 88, 90, and 92 request information concerning how satisfied the consumer was with the transaction between the consumer and the service provider being rated. The information supplied via the entry fields 86-92 will, when received by the Rating Company node 16, be assimilated into the satisfaction rating value accorded the particular service provider, adjusting that value accordingly, and posting this adjusted value to the database $16_j$ for the service provider in question.

Thus, in Step 66, the consumer reads the e-mail, provides at least some of the information requested (a satisfaction factor) and, if he/she chooses to respond, sends a reply e-mail, with the information supplied, back to the Rating Company node 16. Upon receipt by the Rating Company, the information at least pertaining to a satisfaction factor is extracted from the reply, and the database $16_b$ accessed for the rating information for the service provider with which the consumer dealt. The satisfaction value for that service provider is updated by the information supplied by the consumer, and the updated value returned to the database $16_a$ for posting to the Web site maintained by the Rating Company node 16 (step 70).

An alternative to asking the consumer to take affirmative steps to registration of his or her credit card number would be for the Rating Company node 16 to negotiate agreements with certain partner financial institutions to automatically register the credit cards (and/or checking accounts—see below) of all or a group of their customers. The Rating Company could then provide the financial institution with marketing materials to be sent to the credit card holders to inform them that the credit cards have been "registered" with the Rating Company 16, and that purchases from those companies "certified" by the Rating Company node will provide certain advantages (e.g., dispute mediation, limited guarantees, etc.). The credit card holder is asked to fill out the form included in the materials, or otherwise contact the Rating Company, to supply an email address which is placed in the database $16_a$. Then, when a transaction is entered with such a certified company, and paid for with the "registered" credit card, it can be detected at the FSP (who will have been provided this information by the Rating Company, as described above). The FSP may then notify the Rating Company node 16 of the transaction to prompt the email delivery as also described above.

Alternatively, for those consumers desiring to pay for services by check, a checking account number can be registered with the Rating Company in the same manner as described above for registering credit card numbers. In this case, the FSP may be the service provider's bank, or a check verification service, or a payment service in the case of on-line payments (e.g., on-line banking).

A further alternative, for those consumers that do not make payment for a transaction with a credit card, and/or who do not register beforehand, may be to have the Service Provider node 14 obtain the consumer's email address at the time of the transaction (or any other time for that matter), and send (e.g., by facsimile transmission) the consumer's email address to the Rating Company node 16. Or, the consumer may register the transaction by sending information of the transaction to the Rating Company node 16 (again, by a facsimile transmission, or by calling an "800" number).

In a yet further alternative of the invention, should the consumer wish to register a transaction that is paid for using cash or unregistered credit cards or checking accounts, the consumer may register the transaction manually using the Rating Company's web site. By providing information such as the Service Provider's Merchant number and the date and size of the transaction, the Rating Company can double-check the validity of the transaction through an email or fax communication to the Service Provider. Verified transactions will result in a real-time updating of the Service Provider's satisfaction level, just as it would for automated transactions described above.

While the present invention has been described in terms of various embodiments, it will be apparent to those skilled in this art that various modifications and alterations can be made. For example, rather than having the consumer register through the on-line Web site, as described above, the consumer can register when the services are purchased by the service provider. The service provider would then forward to the Rating Company the email identification so that an email can be sent to solicit the consumer's satisfaction of the services rendered. A further alternative could be to register the consumer's bank account number so that, in the event the service obtained is paid for by check, the bank will detect that payment and notify the Rating Company accordingly. Finally, the consumers could register these services by telephone, or be automatically called by the Rating Company to register his ratings opinion, as described above.

Therefore, although the invention has been described in terms of several specific embodiments, it should be understood that the invention is not limited to the disclosed embodiments. To the contrary, the present invention is intended to cover various modifications and equivalent structures included within the spirit and scope of the appended claims

What is claimed is:

1. A method comprising:

receiving at a rating provider computer node a notification of a transaction between a customer via a customer computer node and a service provider via a service provider computer node using a payment method, the notification being sent to the rating provider computer node via a communication network in response to the transaction being identified by a financial service provider computer node based on a search conducted by the financial service provider computer node based on the payment method, the search being conducted after the transaction has been completed, the payment method being used to register the customer as an evaluator at the rating provider computer node before the payment method is provided to the service provider computer node to consummate the transaction;

sending to the customer via the customer computer node a request for a feedback from the customer regarding the transaction, the sending being performed in response to the notification; and updating at the rating provider computer node a rating of the service provider based at least in part on the feedback received from the customer via the customer computer node.

2. The method of claim 1, wherein the updating is performed in real-time, the method, further comprising:

changing a status of the service provider when the rating of the service provider falls below a predetermined criteria.

3. The method of claim 1, wherein the notification is defined at the financial service provider computer node in response to the financial service provider computer node determining that the customer is registered as the evaluator.

4. The method of claim 1, wherein the notification is associated with at least one of an amount of a payment associated with the transaction between the customer and the service provider or a date of the transaction.

5. The method of claim 1, wherein the search is conducted by the financial service provider computer node based on a financial account number associated with the payment method, the financial account number is associated with one of a checking account or a credit card account, the notification includes the financial account number.

6. A method comprising:

sending, from a rating provider computer node, evaluator registration information associated with a plurality of customers to a financial service computer node via a communication network, the financial service computer node being independent from the plurality of customers and a service provider;

receiving from the financial service computer node a value associated with a monetary transaction between a customer from the plurality of customers and the service provider, the monetary transaction being detected at the financial service computer node based on the evaluator registration information;

sending to the customer via a customer computer node a feedback request associated with the monetary transaction based at least in part on the evaluator registration information and the value;

receiving, from the customer via the customer computer node, a feedback associated with the service provider; and updating a service rating of the service provider based at least in part on the feedback.

7. The method of claim 6, wherein the sending includes sending from the rating provider computer node, each customer from the plurality of customers is registered as an evaluator at the rating provider computer node, the monetary transaction is detected at the financial service computer node after the sending.

8. The method of claim 6, wherein the value is a merchant number associated with the service provider, the receiving includes receiving a financial identifier associated with the customer, the merchant number and the financial identifier being included in the evaluator registration information, the sending includes sending based on the financial identifier.

9. A method comprising:

registering a customer at a rating provider computer node as an evaluator of a service provided by a service provider based on a financial account number associated with the customer;

receiving, at the rating provider computer node via a communication network, information associated with a transaction between the customer and the service provider from a third party computer node, the third party node being independent from the customer and the service provider; and sending to a customer computer node associated with the customer via the communication network a feedback request associated with the transaction when the transaction is detected at the third party computer node based on the financial account number, the feedback request being at least partially based on the received information.

10. The method of claim 9, wherein the third party computer node is a financial institution node of the service provider.

11. The method of claim 9, wherein the transaction is detected at the third party computer node after the registering.

12. The method of claim 9, wherein the sending includes sending only when the customer has been registered at the rating provider computer node as the evaluator of the service, the method further comprising:

receiving, from the customer via the customer computer node, feedback associated with the service provider in response to the feedback request; and updating a service rating of the service provider based at least in part on the feedback.

13. The method of claim 9, wherein the receiving includes receiving from the third party computer node when it is determined based on the financial account number that the customer has been registered at the rating provider computer node as the evaluator of the service.

* * * * *